(12) United States Patent
Dinnan

(10) Patent No.: US 6,951,367 B1
(45) Date of Patent: Oct. 4, 2005

(54) VEHICLE SEAT PAD

(76) Inventor: Jane L. Dinnan, 1240 Old Course La., Mount Pleasant, SC (US) 29466

( * ) Notice: Subject to any disclaimer, the term of this patent is extended or adjusted under 35 U.S.C. 154(b) by 0 days.

(21) Appl. No.: 10/855,766

(22) Filed: May 26, 2004

(51) Int. Cl.[7] .......................... A47C 31/11; A47C 7/14; A47C 7/38
(52) U.S. Cl. .............................. 297/228.12; 397/228.1; 397/229; 397/230.1; 397/230.13; 397/284.11; 397/397
(58) Field of Search ....................... 297/228.12, 228.1, 297/228.11, 228.13, 229, 230.1, 230.11, 230.13, 297/284.11, 397

(56) References Cited

U.S. PATENT DOCUMENTS

| | | | |
|---|---|---|---|
| 3,608,964 A * | 9/1971 | Earl | 297/397 |
| 4,383,713 A * | 5/1983 | Roston | 297/228.12 |
| 4,394,783 A * | 7/1983 | Simmons | 297/230.1 |
| 4,747,639 A * | 5/1988 | Pfau | 297/284.11 X |
| 4,838,611 A | 6/1989 | Talaugon | |
| 5,228,745 A * | 7/1993 | Hazel | 297/229 |
| 5,272,780 A | 12/1993 | Clute | |
| 5,275,463 A * | 1/1994 | Rocha | 297/229 |
| 5,310,245 A * | 5/1994 | Lyszczasz | 297/230.1 X |
| 5,383,711 A | 1/1995 | Houghteling | |
| 5,456,519 A * | 10/1995 | Davis | 297/230.13 X |
| 5,533,787 A * | 7/1996 | Xiang | 297/284.5 |
| 5,669,665 A | 9/1997 | Nowak | |
| 5,702,153 A * | 12/1997 | Pliska | 297/228.12 X |
| 5,735,576 A | 4/1998 | Pepys et al. | |
| 5,829,829 A | 11/1998 | Celestina-Krevh | |
| 5,906,413 A * | 5/1999 | Yang | 297/230.1 X |
| 5,916,089 A | 6/1999 | Ive | |
| 5,918,933 A | 7/1999 | Hutchinson et al. | |
| 6,086,152 A * | 7/2000 | Zeller | 297/284.11 X |
| 6,131,995 A * | 10/2000 | Smith | 297/229 |
| 6,135,635 A * | 10/2000 | Miller et al. | 297/229 X |
| 6,139,100 A | 10/2000 | Baskin-Lockman et al. | |
| 2002/0021034 A1 * | 2/2002 | Morgan et al. | 297/228.12 |

* cited by examiner

Primary Examiner—Rodney B. White
(74) Attorney, Agent, or Firm—B. Craig Killough

(57) ABSTRACT

A vehicle seat pad having a first head support and a second head support that are adjustably attached to an upper portion of an elongated pad. Leg support is provided at a lower portion of the elongated pad, by positioning a portion of the elongated pad over another portion of elongated pad. Pillows may inserted in pockets in the elongated pad to provide additional leg support or to provide additional head support. The elongated pad may be rolled, with straps provided to allow the device to be carried on the back.

11 Claims, 7 Drawing Sheets

VEHICLE SEAT PAD

FIELD OF THE INVENTION

This invention relates to support surfaces for humans generally, and is more specifically directed to a pad or cushion for vehicle seats that may be rolled and transported by carrying.

BACKGROUND OF THE INVENTION

Vehicle seats, such as automobile seats and airplane seats, are constructed so that one size fits all. However, in practice, one size does not fit all, and a seat cushion or pad is needed that will provide proper support for some individuals. In particular, the head and legs of a six year old child do not rest upon a vehicle seat in the same position as a six feet tall adult. Similarly, the head and legs of an adult who is less than five feet tall are not positioned on a vehicle seat in the same place as an adult who is six feet tall. Accordingly, there is a need for a cushion or pad that will provide additional head and leg support, particularly for children and shorter adults.

The vehicle seat pad or cushion should be variably adjustable. The head support and leg support should be capable of adjustment according to the user, and further, adjustable as a child grows. Still further, the vehicle seat pad or cushion should be capable of adjustment according to the situation, that is, the position of supports is dependent upon whether the occupant is attempting to sleep in the vehicle seat, or is riding in the vehicle seat, or desires to be positioned in the vehicle seat so that the occupant's view is enhanced.

The vehicle seat pad or cushion should be easily transportable. The vehicle seat pad or cushion should be easily installed and removed from an automobile in which the user is riding, and easily transported along with luggage and other items to an airplane seat, and positioned on the airplane seat. The vehicle seat pad or cushion should be easily transportable from a first connecting airplane flight, through an airport, and to a second connecting airplane flight.

The vehicle seat pad should provide head and neck support for children, and specifically small children. Accordingly, a wide range of adjustment for the head support should be provided, and the head support should be variably adjustable from one side to the other side.

SUMMARY OF THE PRESENT INVENTION

The present invention is a vehicle seat pad having an elongated pad. The elongated pad has a first head support and a second head support that are adjustably attached to the upper portion of the elongated pad. Leg support is provided at a lower portion of the elongated pad, by positioning a portion of the elongated pad over another portion of elongated pad. Pillows may inserted in pockets in the elongated pad to provide additional leg support or to provide additional head support. The elongated pad may be rolled, with straps provided to allow the device to be carried on the back.

DETAILED DESCRIPTION OF THE PREFERRED EMBODIMENT

Figure 1:
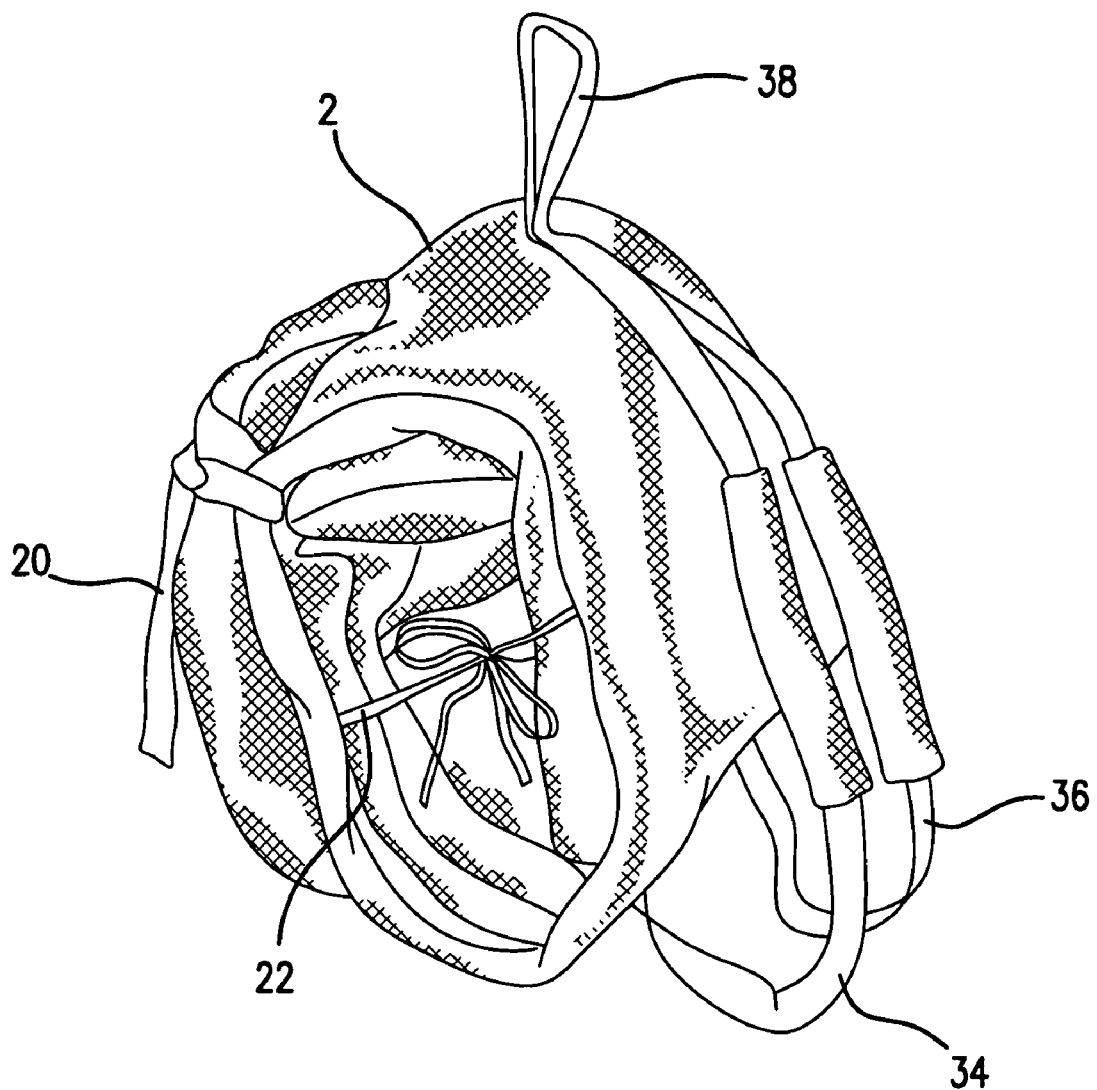
FIG. 1 is a perspective view of the vehicle seat pad rolled and formed as a backpack.
Figure 2:
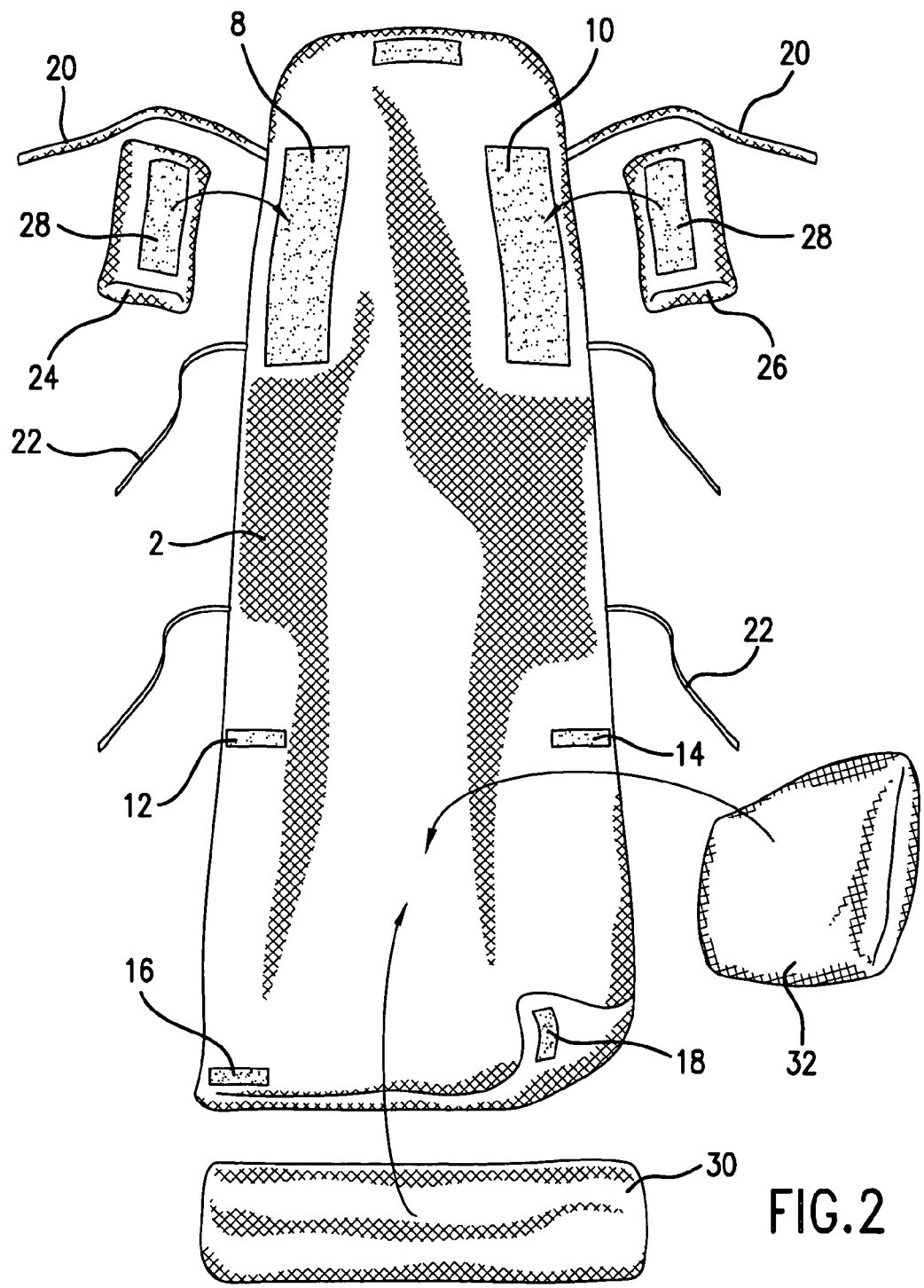
FIG. 2 is a perspective view of the vehicle seat pad showing the anterior portion of the vehicle seat pad.

FIG. 2 shows an anterior side of the elongated pad 2. The elongated pad is preferred to be formed of a textile material of several layers, so that adequate padding is provided. The elongated pad may be formed of quilted material, such as material that is commonly used to make children's bedding materials. The pad may have a durable textile outer covering, with felt or similar padding materials therein. The elongated pad may also be made of materials used to make sleeping bags. The pad may be formed of foam materials, such as closed-cell foam. The critical features of the elongated pad are that it be readily formed into a roll, such as the roll shown in FIG. 1, and that it be formable against vehicle seats of differing geometries, including automobile seats 4, demonstrated by FIG. 4 through FIG. 6.

Figure 7:
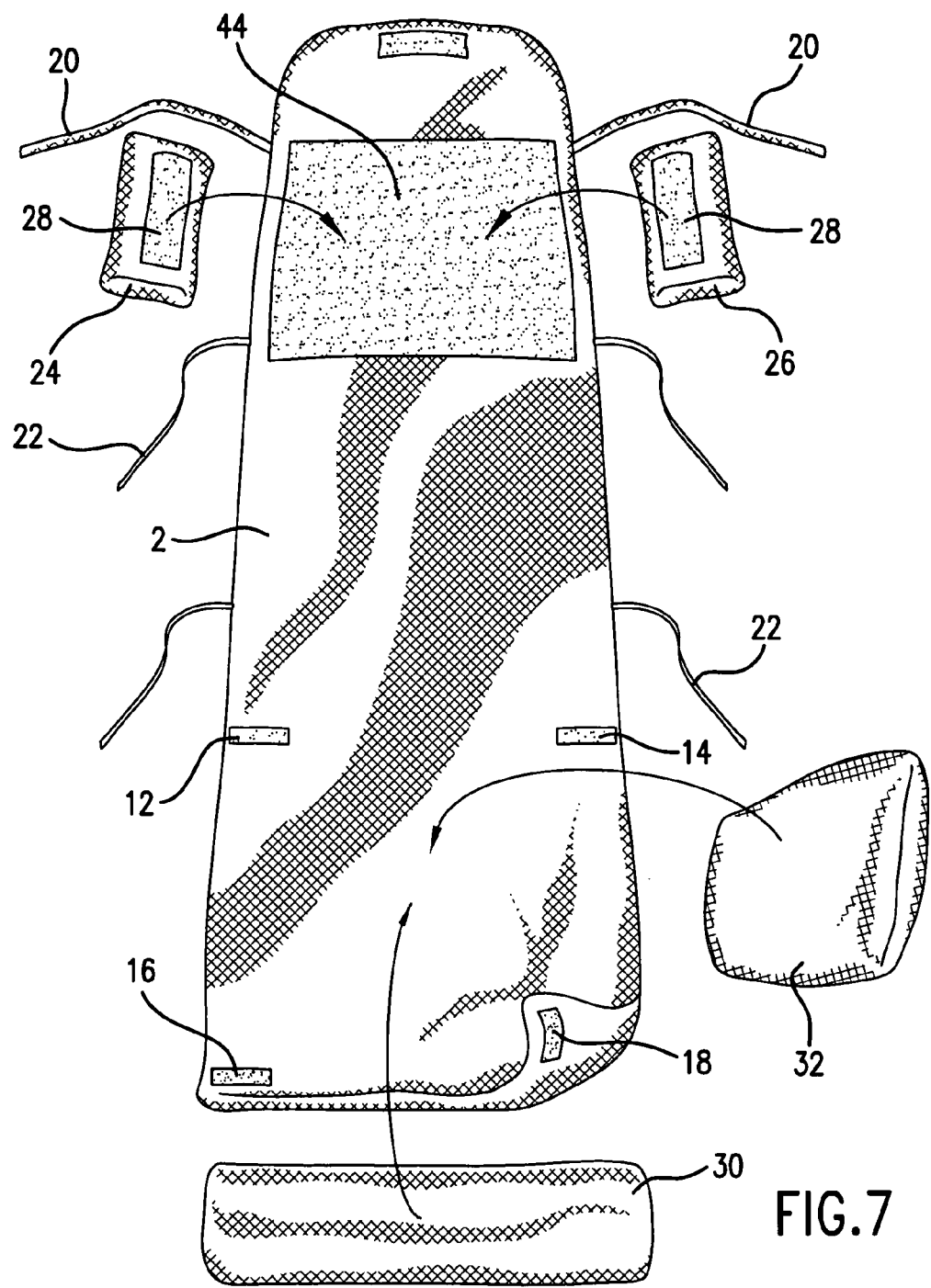
FIG. 7 is a perspective view of the vehicle seat pad showing an additional embodiment of the anterior portion of the vehicle seat pad.

As shown in FIG. 2, the elongated pad can be opened and rolled flat. In this position, the pad 2 may be used as bedding material, with the device mounted, or not mounted, to a vehicle seat. The elongated pad has an upper, generally horizontal piece 6 of hook or loop material that is fixed to the elongated pad. A first generally vertical strip 8 of hook or loop material and a second strip 10 of generally vertical hook or loop material that are attached to the elongated pad. Alternatively, the elongated pad has an area 44 of hook and look material that is attached to the elongated pad. FIG. 7.

The elongated pad has a first lower and generally horizontal strip 12 of hook or loop material, and a second lower and generally horizontal strip 14 of hook or loop material. The elongated pad has strips 16 of hook or loop material attached near the lower end of the elongated pad on the anterior side, and strips 18,19 of hook or loop material attached near the lower end of the posterior side.

The elongated pad has a series of ties 20,22. These ties are used to attach the vehicle seat pad to the vehicle seat, and/or to tie the vehicle seat pad after it is rolled as shown in FIG. 1.

A first head support 24 and a second head support 26 are provided. Hook or loop material 28 is attached to the posterior side of the first head support and the second head support. The hook or loop material is fitted so that the first head support and the second head support may be attached to the hook or loop material on the elongated pad, with the first head support and the second head support held in position by the hook and loop material mounting. It is preferred that the length of area 44 of the hook or loop material mounted to the elongated pad exceeds the length of the strips 28 of hook or loop material that are mounted to the first head support and the second head support, and that the length of area 44 of hook or loop material that are mounted to the elongated pad exceed the overall length of the first head support and the second head support, and that the area cover most of the width of the elongated pad, so that the head supports are variably adjustable over a wide range of positions, and so that the vehicle seat pad is usable for occupants of a wide range of heights and sizes. The hook or loop material also allows the head supports to be positioned variably in a horizontal manner, in addition to being adjustable in a vertical manner. If individual strips 8,10 of hook an loop material are mounted to the elongated pad, it is preferred that the strips have lengths that are in excess of the length of the first head support and second head support, and that the strips are wider than the strips mounted to the first head support and second head support, so that the head supports may be moved about according to the needs of the occupant.

Two or more pillows 30, 32 are provided. At least one of these pillows 30 is preferred to have a length that will substantially traverse the width of the elongated pad. At least one of the remaining pillows may be used for leg support, or it may be used for head support, by inserting this pillow into a pocket 40 formed in the posterior side of the elongated pad as shown in FIG. 3.

Figure 5:
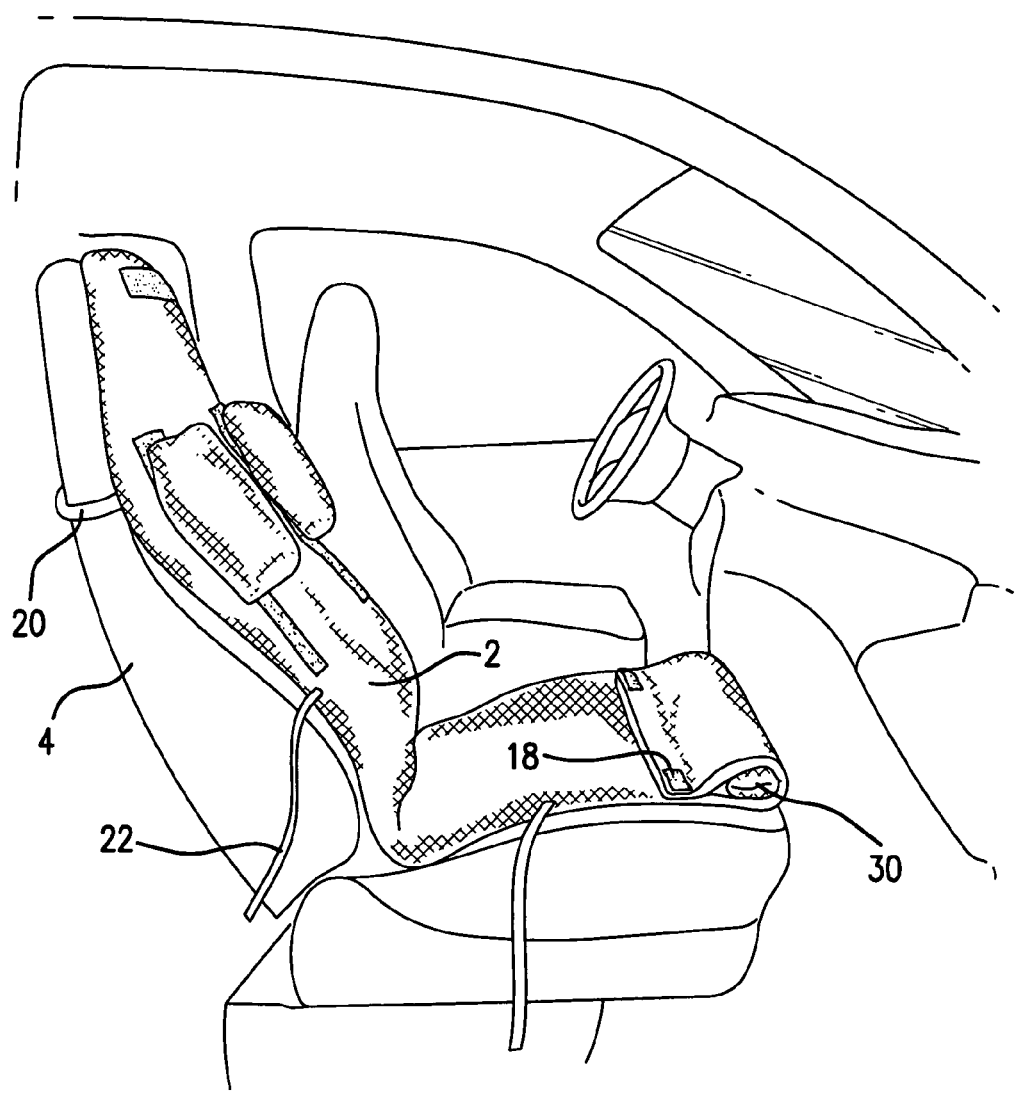
FIG. 5 is a perspective view of the vehicle seat pad mounted in an automobile showing the seat pad in an alternative position.
Figure 6:
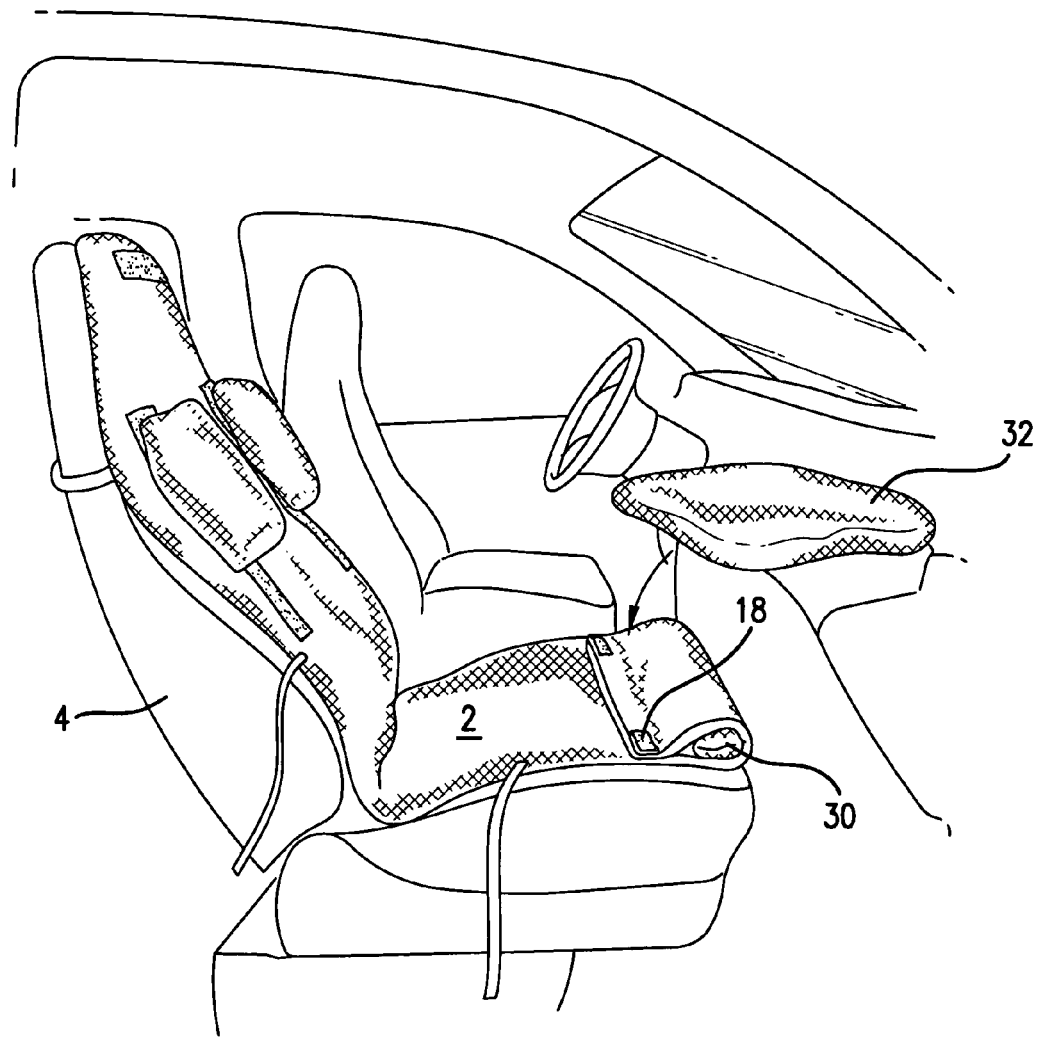
FIG. 6 is a perspective view of the vehicle seat pad mounted in an automobile showing the seat pad in an additional alternative position.

The leg support is used by forming the device as shown in FIG. 5. The strips 12,14 of hook or loop material are joined to the strips 16 of hook or loop material. The pillow is positioned between these portions of elongated pad, and a pocket formed thereby, to provide leg support and elevation. As shown in FIG. 6, additional pillow 32 may be inserted in this pocket. This configuration will particularly elevate and support the legs of small children.

Figure 3:
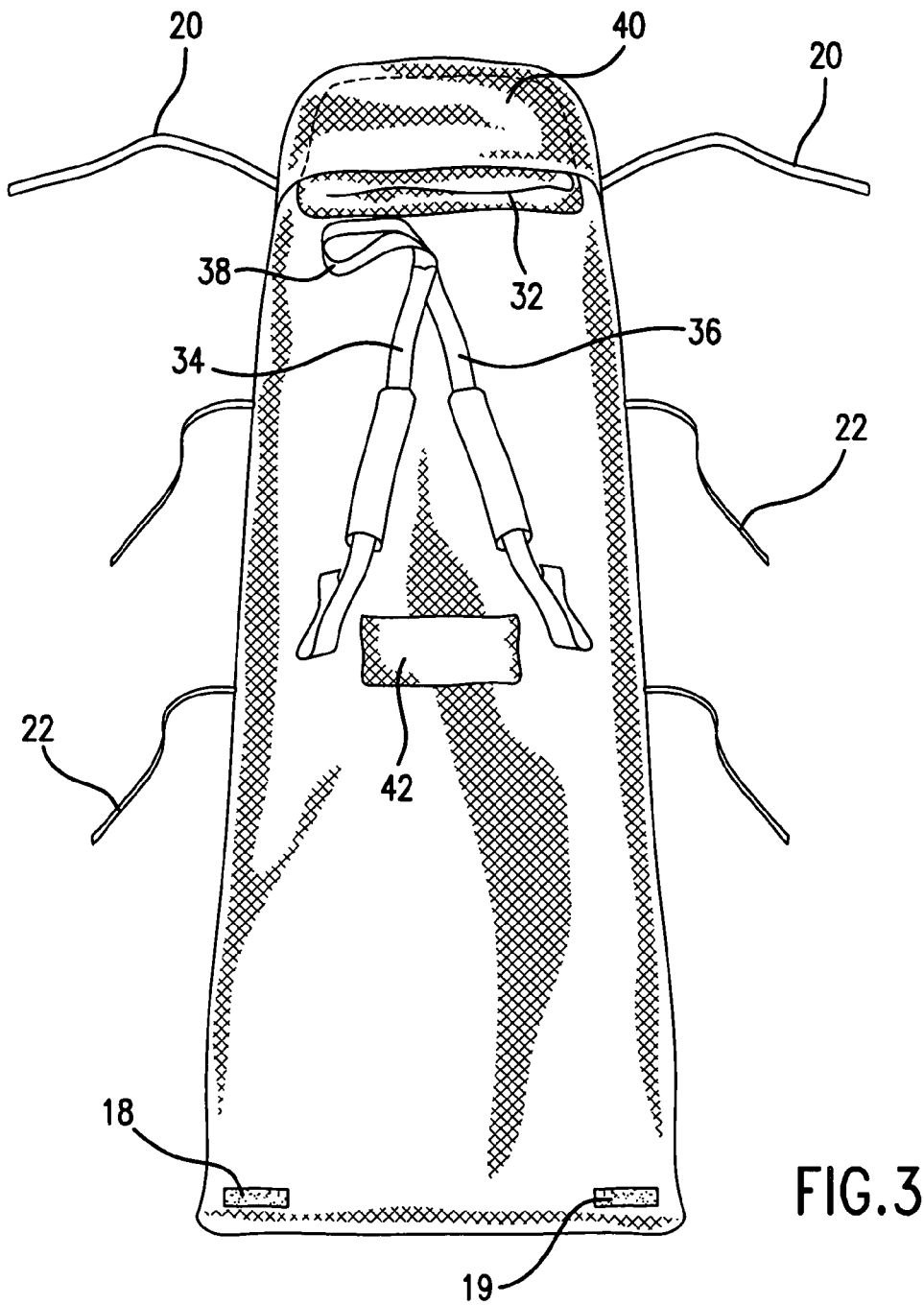
FIG. 3 is a perspective view of the vehicle seat pad showing the posterior portion of the vehicle seat pad.

Referring to FIG. 3, first arm strap 34 and second arm strap 36 are provided on the posterior side. When the device is rolled as shown in FIG. 1, the arm straps allow the device to be worn as a backpack. The upper ends of the straps form a handle, so that the device may be carried in one hand by the loop 38 that provides a handle. A flap 42 is provided on the posterior side for covering a strip of hook and loop material that is attached to strip 6 of hook and loop material when the device is rolled, to secure the device in the rolled position.

As shown in FIG. 1, the device is rolled for transportation. The straps are used to hold the elongated pad in the rolled position. The arm straps are in position to be used to carry the device as a backpack. Alternatively, the handle formed by the loop can be used to carry the device as a backpack. The pillows in the head support may be rolled within the elongated support pad and transported in the interior of the rolled device. The ties assist in retaining the pillows and the head supports within the interior of the backpack.

Figure 4:
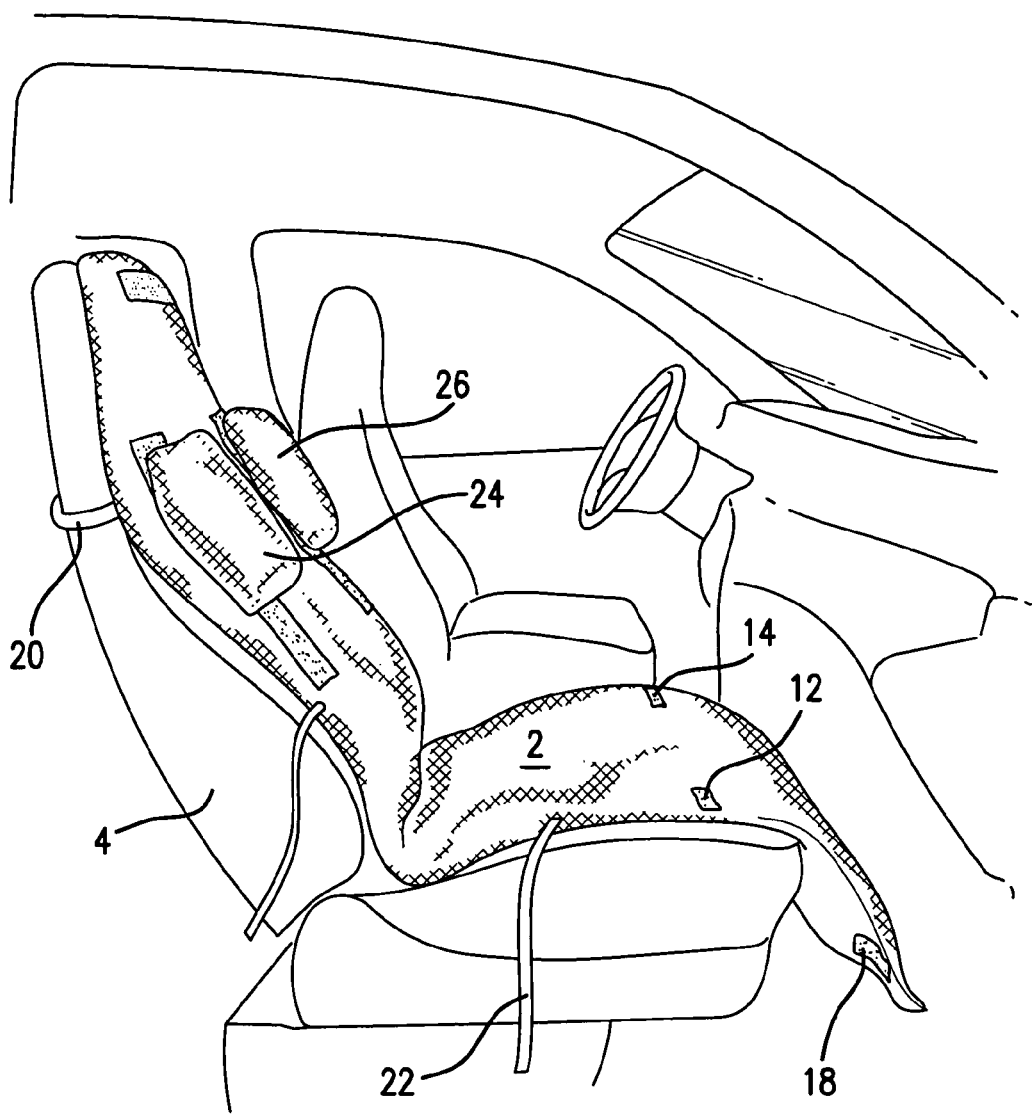
FIG. 4 is a perspective view of the vehicle seat pad mounted in an automobile.

In use, the device is rolled for transportation as shown in FIG. 1. The device is then unrolled, and positioned in the vehicle seat as shown in FIG. 4. The straps are used to tie the device to the vehicle seat, particularly using the larger upper strap. The strips 18,19 of hook and loop material as shown on the lower anterior portion of the device (FIG. 4) could be used to mount the lower end to hook and loop material mounted on the vehicle seat.

The device may be removed from the seat and transported as needed, and may be attached to airplane seats, transporting the device between connecting flights, and attached to the seat of a different automobile when the destination is reached.

What is claimed is:

1. A vehicle seat pad, comprising:
   a) an elongated pad that conforms to cover a seating surface of a seat bottom and a seating surface of a seat back of a full size seat of a vehicle, wherein said elongated pad has an area of hook and loop material that is present on a portion of said elongated pad that corresponds to said seating surface of said seat back;
   b) a first head support having an area of hook and loop material thereon, wherein said first head support is attached by said area of hook and loop material that is present on said first head support to said area of hook and loop material that is present on said portion of said elongated pad that corresponds to said seating surface of said seat back, wherein the area of hook and loop material that is present on said portion of said elongated pad that corresponds to said seating surface of said seat back is wider than said area of hook and loop material that is present on said first head support, and wherein a position of said first head support is adjustable relative to said elongated pad by movement of said area of hook and loop material of said first head support relative to said area of said hook and loop material of said elongated pad; and
   c) a second head support.

2. A vehicle seat pad as described in claim 1, wherein said second head support has an area of hook and loop material thereon, wherein said second head support is attached by said area of hook and loop material that is present on said second head support to a second area of hook and loop material that is present on said portion of said elongated pad that corresponds to said seating surface of said seat back, wherein the second area of hook and loop material that is present on said portion of said elongated pad that corresponds to said seating surface of said seat back is wider than said area of hook and loop material that is present on said second head support, and wherein a position of said second head support is adjustable relative to said elongated pad by movement of said area of hook and loop material of said second head support relative to said second area of said hook and loop material of said elongated pad.

3. A vehicle seat pad as described in claim 2, wherein the second area of hook and loop material that is present on said portion of said elongated pad that corresponds to said seating surface of said seat back is longer than said area of hook and loop material that is present on said second head support.

4. A vehicle seat pad as described in claim 1, wherein the area of hook and loop material that is present on said portion of said elongated pad that corresponds to said seating surface of said seat back is longer than said area of hook and loop material that is present on said first head support.

5. A vehicle seat pad as described in claim 1, further comprising a first leg support formed by positioning a first lower portion of said elongated pad over a second lower portion of said elongated pad, and attaching said first lower portion to a remainder of said elongated pad.

6. A vehicle seat pad as described in claim 5, further comprising a first pillow that is present within said first leg support and between said first lower portion of said elongated pad and said second lower portion of said elongated pad.

7. A vehicle seat pad as described in claim 1, wherein said first head support is not attached to said second head support.

8. A vehicle seat pad as described in claim 1, further comprising a pocket formed in said upper portion of said elongated pad.

9. A vehicle seat pad as described in claim 1, further comprising a pillow that is present in a pocket that is formed in an upper posterior portion of said elongated pad.

10. A vehicle seat pad as described in claim 1, further comprising at least one strap, wherein said at least one strap attaches said elongated pad to a vehicle seat, and wherein said elongated pad is formable into a roll, and said at least one strap forms a handle for carrying the vehicle seat pad when said elongated pad is formed into a roll.

11. A vehicle seat pad as described in claim 1, further comprising at least one strap attached to a posterior side of said elongated pad, wherein said at least one strap attaches said elongated pad to a vehicle seat, and wherein said elongated pad is formable into a roll, and said at least one strap forms a handle for carrying the vehicle seat pad when said elongated pad is formed into a roll.

* * * * *